(12) United States Patent
Ehrensperger et al.

(10) Patent No.: US 9,745,221 B2
(45) Date of Patent: Aug. 29, 2017

(54) TRANSLUCENT GLAZING COMPRISING AT LEAST ONE PATTERN THAT IS PREFERABLY TRANSPARENT

(71) Applicant: SAINT-GOBAIN GLASS FRANCE, Courbevoie (FR)

(72) Inventors: Marie-Virginie Ehrensperger, Aix-les-bains (FR); François Guillemot, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 102 days.

(21) Appl. No.: 14/414,308

(22) PCT Filed: Jul. 11, 2013

(86) PCT No.: PCT/FR2013/051663
§ 371 (c)(1),
(2) Date: Jan. 12, 2015

(87) PCT Pub. No.: WO2014/009667
PCT Pub. Date: Jan. 16, 2014

(65) Prior Publication Data
US 2015/0210586 A1    Jul. 30, 2015

(30) Foreign Application Priority Data
Jul. 13, 2012   (FR) ..................... 12 56768

(51) Int. Cl.
*C09K 19/00*   (2006.01)
*C03C 17/00*   (2006.01)
(Continued)

(52) U.S. Cl.
CPC .......... *C03C 17/007* (2013.01); *C03C 17/009* (2013.01); *C04B 41/46* (2013.01);
(Continued)

(58) Field of Classification Search
CPC ... C03C 17/007; C03C 17/10; C03C 2017/20; C03C 2017/213; C03C 2017/44;
(Continued)

(56) References Cited

U.S. PATENT DOCUMENTS 6,358,612 B1    3/2002   Bier et al.
2003/0146415 A1   8/2003   Minami et al.
(Continued)

FOREIGN PATENT DOCUMENTS

DE    198 28 231 C2    2/1999
EP    0 661 558 A1     7/1995
(Continued)

OTHER PUBLICATIONS

International Search Report issued in International Patent Application No. PCT/FR2013/051663, dated Sep. 2, 2013.

*Primary Examiner* — Ruiyun Zhang
(74) *Attorney, Agent, or Firm* — Pillsbury Winthrop Shaw Pittman LLP

(57) ABSTRACT

A glazing, which may be translucent, includes at least one design, which may be transparent. The glazing includes a substrate having two main outer surfaces, at least one of which is a textured surface, made of a dielectric material having a refractive index n1 and at least a part of the textured surface of the substrate is coated with a sol-gel layer made of a dielectric material having a refractive index n2.

17 Claims, 3 Drawing Sheets

(51) Int. Cl.
*C04B 41/46* (2006.01)
*C04B 41/50* (2006.01)
*C04B 41/86* (2006.01)
*C23C 18/12* (2006.01)

(52) U.S. Cl.
CPC .......... *C04B 41/5041* (2013.01); *C04B 41/86* (2013.01); *C03C 2217/44* (2013.01); *C03C 2217/477* (2013.01); *C03C 2217/72* (2013.01); *C03C 2217/77* (2013.01); *C03C 2218/113* (2013.01); *C23C 18/122* (2013.01); *C23C 18/1216* (2013.01); *C23C 18/1229* (2013.01); *C23C 18/1254* (2013.01); *Y10T 428/24612* (2015.01)

(58) Field of Classification Search
CPC ........ C03C 2017/477; C03C 2017/478; C03C 2017/72; C03C 2017/77; C03C 2218/113; C04B 41/86; C04B 41/5041; C04B 41/46; C23C 18/1216; C23C 18/122; C23C 18/1254

USPC .............. 428/172, 1.3, 1.51, 1.62, 162, 164; 359/601, 603; 349/112
See application file for complete search history.

(56) References Cited

U.S. PATENT DOCUMENTS

2008/0193721 A1   8/2008  Ukelis et al.
2012/0091488 A1*  4/2012  Vermersch ............ C03C 17/007
                                                       257/98

FOREIGN PATENT DOCUMENTS

WO    2010/112786 A1    10/2010
WO    2010/112788 A1    10/2010

* cited by examiner

Volume Proportions TiO$_2$ (%)

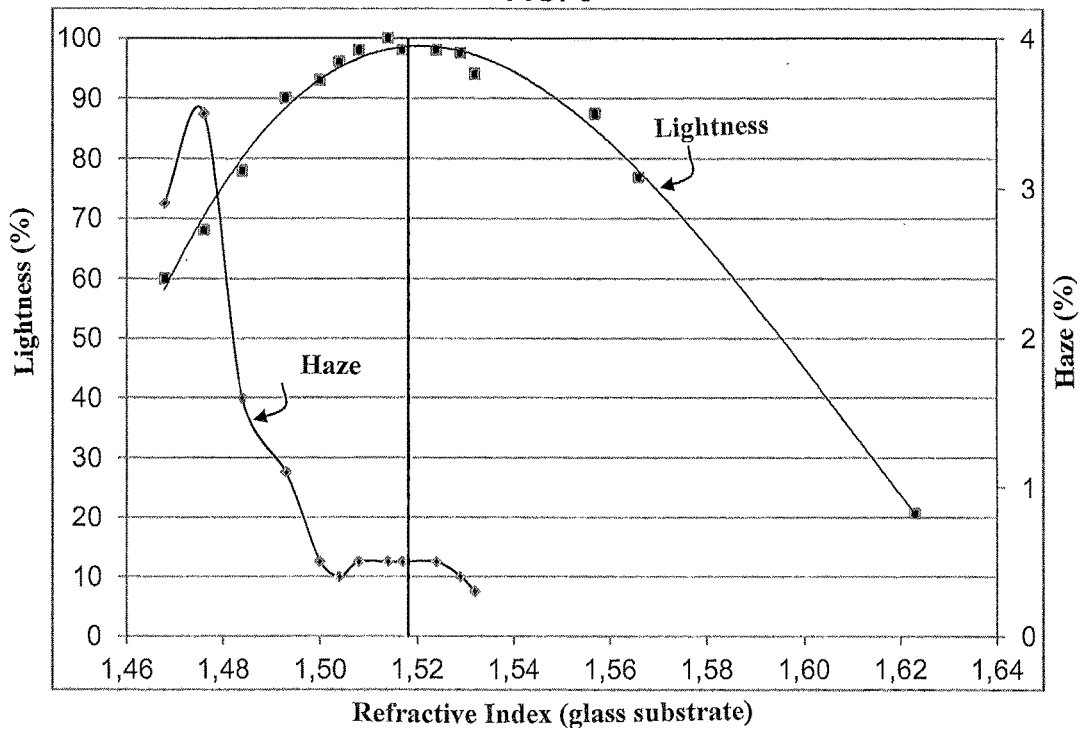
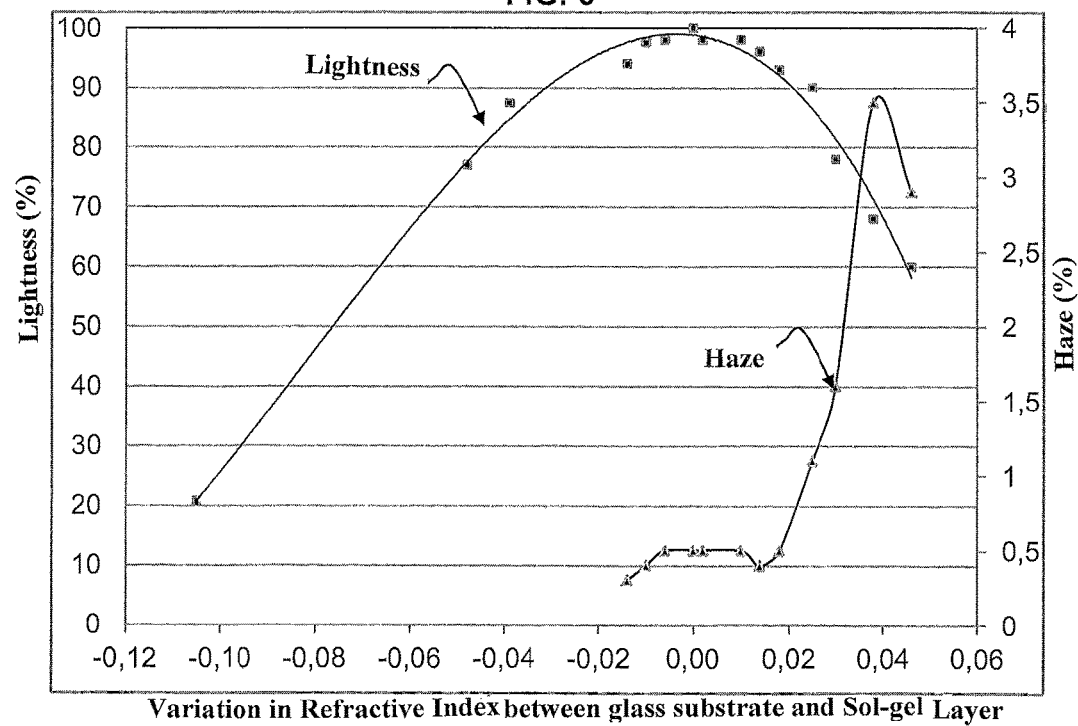

TRANSLUCENT GLAZING COMPRISING AT LEAST ONE PATTERN THAT IS PREFERABLY TRANSPARENT

CROSS-REFERENCE TO RELATED APPLICATIONS

This application is the U.S. National Stage of PCT/FR2013/051663, filed Jul. 11, 2013, which in turn claims priority to French Application No. 1256768, filed Jul. 13, 2012. The contents of all of these applications are incorporated herein by reference in their entirety.

The present invention relates to a glazing, which is preferably translucent, comprising at least one design, which is preferably transparent, and to a process for manufacturing such a translucent glazing.

According to the invention, the term "design" means a form defined on part of the surface of a substrate. This part of the surface of the glazing defining the design has reflection, absorption and/or transmission properties different from those of the other surface parts of the glazing surrounding the design.

Transparent glazings currently exist comprising at least one translucent design. Several techniques are used to obtain such glazings. One of these techniques consists in bonding a diffusing plastic film cut into the desired design onto the glazing. This technique, although simple to perform, has low durability. The reason for this is that such glazings very rapidly have, and all the more so depending on the location of the glazing (UV exposure), an esthetic appearance of reduced quality due especially to aging of yellowing type and/or detachment of the diffusing plastic film.

Other techniques use masks and glass substrates comprising two smooth outer surfaces.

One of these techniques consists in producing designs by texturing part of the surface of the substrate. The designs are obtained by applying a mask to one of the outer surfaces of the substrate, followed by a step of chemical or mechanical attack, of said surface through said mask. However, producing a design by texturing a smooth glass has several drawbacks especially in terms of cost. The masks used for protecting the parts of the surface of the substrate on which good transparency must be conserved must themselves be made of materials that withstand the conditions of chemical or mechanical attack of the substrate. These requirements in terms of resistance necessitate the use of expensive materials. Furthermore, these processes involve the succession of three steps that must be performed early in the transformation chain. Specifically, if it is desired to produce a substrate that is translucent in places by acid attack, it is first necessary to place a protection on the substrate, to perform the acid attack and to remove the protection. The choice of design must thus be made before the step of attacking the substrate to make it translucent.

Another technique consists in depositing on one of the smooth surfaces of the substrate a layer of translucent enamel of the type such as Emalite®, for example through a mask. The deposition of such a layer has the drawback of needing to be annealed at high temperature. The glazing thus obtained is thus generally tempered after application of the design. This process then generally demands to be performed once the size of the glazing has been set.

The use of masks limits the choice of designs since they do not make it possible to produce all kinds of designs. For example, it is occasionally impossible to produce holes of small diameter on certain masks. Consequently, such masks cannot make it possible to obtain small-sized designs.

The present invention is directed toward developing a translucent glazing comprising at least one design and a process for manufacturing such a translucent glazing that does not have the drawbacks of the prior art. In particular, the present invention is directed toward a process that has the following advantages:
   ease of implementation and lowered manufacturing cost,
   production of multiple decorative designs of complex and varied shapes, which cannot be produced via other techniques,
   great flexibility regarding the choice of substrates constituting the glazing.

The Applicant has developed a novel process for manufacturing a translucent glazing that may comprise designs satisfying these requirements.

The invention thus relates to a glazing comprising a substrate having two main outer surfaces, at least one of which is a textured surface, consisting of a dielectric material having a refractive index $n_1$, characterized in that:
   at least a part of the textured surface of the substrate is coated with a sol-gel layer consisting of a dielectric material having a refractive index $n_2$,
   the absolute value of the difference in refractive index at 589 nm between the constituent dielectric materials of the substrate and the sol-gel layer is less than or equal to 0.020.

Preferably, the substrate has two main outer surfaces, at least one of which is a textured surface and the other is a smooth surface. The glazing comprising a substrate having two main outer surfaces, at least one of which is a textured surface, is a translucent glazing.

The invention also relates to the process for manufacturing such a glazing, characterized in that:
   a substrate is provided comprising a textured surface with a refractive index n1,
   a sol-gel layer consisting of a dielectric material with a refractive index n2 and for which the absolute value of the difference in refractive index at 589 nm between the constituent dielectric materials of the substrate and of the sol-gel layer is less than or equal to 0.020 and preferably less than or equal to 0.015 is selected and deposited on at least part of the textured surface of the substrate.

According to the invention a textured or rough surface is a surface for which the surface properties vary at a larger scale than the wavelength of the radiation incident on the surface. The presence of this texturing has the effect that radiation incident on this surface with a given incident angle is reflected and transmitted by this surface in a plurality of directions. This incident radiation is transmitted and reflected in a diffuse manner by the surface. The texture or roughness of the textured surface of the substrate is formed by a plurality of designs that are hollowed or protruding, periodic, aperiodic or random, relative to a general plane of the textured surface of the substrate.

A textured or rough surface according to the invention has, for example, a roughness parameter Ra of at least 0.5 μm corresponding to the arithmetic mean of all the absolute distances of the roughness profile R measured from a median line of the profile over an evaluation length. To define the texturing of the substrate, use may additionally be made of the roughness parameter RSm, which is the mean value of the widths of the elements of the profile. The parameter RSm may thus range from 10 μm to 100 μm and even more preferentially from 10 to 65 μm.

The thickness defined between the lowest hollow and the highest projection or peak corresponds to the value or height known as the peak-to-valley value. According to the invention, the thickness of the sol-gel layer is defined from the lowest hollow of the textured surface of the substrate.

The determination of roughness parameters is defined in standard NF EN ISP 4287. These roughness parameters may be measured in various ways:

- by optical profilometry, according to the principle of color wide-field microscopy, for example using the MIM2 base station from the company Stil,
- by optical interferometry, for example using the Newview machine from the company Zigo, or
- by a mechanical point system (for example using the measuring instruments sold by the company Veeco under the name Dektak.

A textured surface comprising a sol-gel layer thus corresponds to a part of the textured surface of the substrate on which the sol-gel layer has been deposited and fills at least part of the roughness of the substrate.

The specific use of a sol-gel layer according to the invention comprising an index substantially equal to that of the textured substrate makes it possible to obtain different effects depending on the nature, but above all the thickness of the sol-gel layer applied to the substrate.

According to an embodiment, the process of the invention makes it possible to obtain novel textured designs, i.e. designs having texturing different from that of the textured substrate used as starting materials. The process of the invention thus makes it possible to produce different textures from the same starting textured substrate by adjusting the thickness or the refractive index of the sol-gel layer deposited onto the textured surface of the substrate.

The application of the sol-gel layer to at least part of a thickness corresponding to the roughness parameter value Ra or to the peak-to-valley height of the textured surface of the substrate makes it possible to modify the roughness and optionally the shape of the texturing designs. For example, when a textured glass is used comprising pyramids as texturing design, application of the sol-gel layer will modify the shape of these designs, which will then have a truncated pyramid shape.

Above all, however, the part of the textured surface of the substrate comprising a sol-gel layer may define a transparent design especially when the sol-gel layer sufficiently fills the texturing of the substrate. The use of the sol-gel layer according to the invention makes it possible to make the textured and thus translucent substrate once again smooth and transparent.

According to an alternative, the sol-gel layer may be colored. The glazing thus obtained may therefore comprise colored designs giving unique decorative effects.

The sol-gel layer may optionally be deposited through a mask. However, since the sol-gel solution before crosslinking to form the sol-gel layer is not acidic or corrosive, it is not capable of attacking the constituent materials of the mask. The mask may thus be made of materials that are less expensive than in the case where acid attack is performed. Furthermore, the installations for performing this operation will be less expensive and not problematic in terms of safety and of environment.

The sol-gel layer, contrary to enamel layers, does not require a high-temperature heat treatment. The glazings according to the invention are not mandatorily tempered and may therefore be recut to the desired sizes after producing the design. The glazing according to the invention may thus undergo before or after formation of the design the following transformations: cutting, forming, fashioning, tempering, double-glazing lamination. The absence of need for a heat treatment to form the design contributes to the flexibility of choice of the starting substrate.

The Applicant has discovered that the particularly advantageous transparency properties of the designs of the glazing of the invention are due to the index harmony between the substrate and the sol-gel layer, i.e. the fact that these two elements have substantially the same refractive index.

The index harmony or index difference corresponds to the absolute value of the difference in refractive index at 589 nm between the constituent dielectric materials of the substrate and of the sol-gel layer. According to the invention, the variation in refractive index between the textured or rough substrate and the material constituting the sol-gel layer should preferably be less than 0.020 and better still less than 0.015. When the sol-gel layer sufficiently fills the roughness of the textured surface of the substrate and when the index difference is low, extremely clear vision through the glazing is obtained in this case.

However, it is not always possible to obtain such a low index variation. For example, for standard glasses, the index of a glass of the same type may vary from one factory to another between 1.517 and 1.523. This variation of the order of 0.006 is non-negligible in the face of the index difference acceptance range to obtain excellent transparency.

The Applicant has discovered that the specific use of a particular sol-gel layer makes it possible readily to prepare glazings that are translucent and transparent in places. The sol-gel layer of the invention has, depending on the proportions of the various precursor compounds constituting it, an adaptable refractive index that may especially vary within a range from 1.459 to 1.700 and preferably 1.502 to 1.538.

By means of the solution of the invention, it is thus possible to adapt with precision the refractive index so as to ensure that the index difference between the substrate and the sol-gel layer is less than a defined value.

The flexible formulation in terms of index of the sol-gel layer of the invention makes it possible to obtain glazings that are transparent in places, having a constant quality in terms of optical performance, irrespective of the source of the substrate or the nature of the substrate.

The specific choice of a sol-gel layer makes it possible:
- to match precisely the index of the substrate, whereas this is not possible with other types of materials such as layers of enamel,
- to adapt to the precise index of the glass as a function of its source,
- to obtain a composition that is adjustable as a function of the nature of the substrate, whether it is mineral or organic,
- to add easily a component giving a colored appearance to the sol-gel layer,
- to apply the sol-gel layer to surfaces of complex form and of diverse sizes without the need for heavy equipment;
- to obtain deposits of homogeneous surface, composition and thickness.

According to one embodiment, the sol-gel layer has a thickness that is sufficient to smooth out at least part of the textured surface of the substrate covered with said sol-gel layer. In this case, other advantages arise from the process of the invention. Firstly, the manufacturing costs and the production flexibility are even further lowered. The glazing then comprises in places designs of high transparency reflected especially by low haze values at the surfaces of the textured substrate comprising the sol-gel layer. The extreme clearness of vision in the transparent areas is due to the index harmony being adjusted as finely as possible.

A smooth surface is a surface for which the surface irregularities are such that radiation is not deviated by these surface irregularities. The incident radiation is then transmitted and reflected in a specular manner by the surface. The reflection is said to be specular when incident radiation on the glazing with a given incident angle is reflected by the glazing with a reflection angle equal to the incident angle. Similarly, transmission through a glazing is said to be specular when incident radiation on the glazing with a given incident angle is transmitted by the glazing with a transmission angle equal to the incident angle.

Preferably, a smooth surface is a surface for which the random surface irregularities are smaller in size than the wavelength of the incident radiation on the surface. Preferably, a smooth surface is a surface having either a roughness parameter corresponding to the arithmetic mean difference Ra of less than 0.1 μm and preferably less than 0.01 μm, or slopes of less than 10°.

A transparent design according to the invention thus corresponds to a part of the surface of the glazing through which the reflection and transmission of radiation are specular. It is considered that the design is transparent at least in the wavelength ranges that are useful for the intended application of the element. By way of example, when the element is used as building or vehicle glazing, it is transparent at least in the visible wavelength range.

For the purposes of the invention, the term "index" refers to the optical refractive index, measured at a wavelength of 589 nm.

According to the invention, the absolute value of the difference in refractive index at 589 nm between the constituent dielectric materials of the substrate and of the sol-gel layer is, preferably in increasing order: less than or equal to 0.020, less than or equal to 0.018, less than or equal to 0.015, less than or equal to 0.010, less than or equal to 0.005.

Transparent substrates, of which one of the main surfaces is textured and the other optionally smooth, may be chosen from substrates made of mineral or organic glass, especially from polymers, glasses, ceramics or vitroceramics.

Preferably, the textured surface of the substrate has:
- a roughness parameter Ra of at least 0.5 μm, better still of at least 1 μm and especially between 1 to 5 μm, and preferably from 1 to 3 μm,
- a roughness parameter RSm of between 10 μm and 100 μm and even more preferentially from 10 to 65 μm.

Texturing of one of the main surfaces of the transparent substrates may be obtained via any known texturing process, for example by embossing the surface of the substrate preheated to a temperature at which it is possible to deform it, in particular by lamination using a roller having at its surface texturing complementary to the texturing to be formed on the substrate; by abrasion using abrasive particles or surfaces, in particular by sanding; by chemical treatment, especially acid treatment in the case of a glass or vitroceramic substrate; by molding, especially injection molding in the case of a substrate made of thermoplastic polymer; by etching.

When the transparent substrate is made of polymer, it may be rigid or flexible. Examples of polymers that are suitable according to the invention especially comprise:
polyesters such as polyethylene terephthalate (PET), polybutylene terephthalate (PBT), polyethylene naphthalate (PEN);
polyacrylates such as polymethyl methacrylate (PMMA);
polycarbonates;
polyurethanes;
polyamides;
polyimides;
fluoroester polymers such as ethylene tetrafluoroethylene (ETFE), polyvinylidene fluoride (PVDF), polychlorotrifluoroethylene (PCTFE), ethylene chlorotrifluoroethylene (ECTFE) and fluorinated ethylene-propylene copolymers (FEP);
photocrosslinked and/or photopolymerized resins, such as thiolene, polyurethane, urethane-acrylate or polyester-acrylate resins, and
polythiourethanes.

These polymers generally have a refractive index range of from 1.3 to 1.7.

Among the flexible polymer substrates, mention may be made of inserts or sheets made of thermoformable or pressure-sensitive plastic which may preferably be based on polymers chosen from polyvinyl butyrals (PVB), polyvinyl chlorides (PVC), polyurethanes (PU), polyethylene terephthalates (PET) or ethylene-vinyl acetate (EVA) copolymers.

For example, the substrate may comprise a layer based on an insert or sheet made of thermoformable or pressure-sensitive plastic material textured by compression and/or heating.

Preferably, the substrate is a glass or vitroceramic substrate. Examples of glass substrates that may be used directly as outer layer of the element with layers comprise:
the glass substrates sold by the company Saint-Gobain Glass in the Satinovo® range, which are already textured and have on one of their main surfaces a texture obtained by sanding or acid attack;
the glass substrates sold by the company Saint-Gobain Glass in the range Albarino® S, P or G or in the range Masterglass®, which have on one of their main surfaces a texture obtained by lamination,
high-index glass substrates textured by sanding such as flint glass, sold, for example, by the company Schott under the references SF6 (n=1.81), 7SF57 (n=1.85), N-SF66 (n=1.92) and P-SF68 (n=2.00).

The vitroceramic substrates may also be vitroceramic plates intended especially for covering or receiving heating elements, in particular intended for serving as cooker hobs. Such substrates may comprise a main smooth surface and a main rough surface. The main rough surface is generally connected to the heating elements and also to operating indicators or displays.

A vitroceramic substrate is, at its origin, a glass, known as a precursor glass, whose specific chemical composition makes it possible to bring about controlled crystallization via suitable heat treatments, known as ceramization.

The application of a sol-gel layer to the textured surface of a vitroceramic substrate makes it possible to obtain in places a smooth surface that facilitates the integration and visibility (clear vision) of possible displays arranged under the substrate facing said smooth surfaces.

The thickness of the substrate is preferably between 10 μm and 19 mm and varies according to the choice of the dielectric material.

The textured glass or vitroceramic substrates preferably have a thickness of between 0.4 and 6 mm, preferably 0.7 and 19 mm and preferably 0.7 to 8 mm.

The textured polymer substrates preferably have a thickness of between 0.020 and 2 mm and preferably 0.025 and 0.25 mm.

The substrates based on an insert or sheet made of plastic material preferably have a thickness of between 10 μm and 1 mm and preferably between 0.3 and 1 mm.

The substrates may have a refractive index of between 1.51 and 1.53, for example in the case of using a standard glass.

The sol-gel layer preferably comprises a silica-based organic/inorganic hybrid matrix obtained according to a sol-gel process.

The sol-gel process consists, in a first stage, in preparing a solution known as a "sol-gel solution" containing precursors that give rise in the presence of water to polymerization reactions. When this sol-gel solution is deposited on a surface, by means of the presence of water in the sol-gel solution or on contact with the ambient moisture, the precursors become hydrolyzed and condense to form a network trapping the solvent. These polymerization reactions result in the formation of increasingly condensed species, which lead to colloidal particles forming sols and then gels. The drying and densification of these gels, at a temperature of the order of a few hundred degrees, leads, in the presence of a silica-based precursor, to a sol-gel layer corresponding to a glass whose characteristics are similar to those of a standard glass.

Due to their viscosity, the sol-gel solutions, in the form of a colloidal solution or of a gel, may be readily deposited on the textured surface of the substrate, conforming to the texture of this surface. The sol-gel layer will "fill in" the roughness of the substrate. Specifically, this layer comprises a surface which embraces the surface roughness of the substrate, which is thus textured, and a main outer surface opposite this surface, which is flat. The layers deposited by a sol-gel process thus make planar the surface of the substrate according to the thickness of the sol-gel layer.

According to the invention, the sol-gel layer comprises a silica-based organic/inorganic hybrid matrix. This matrix is obtained from mixed precursors which are organosilanes $R_nSiX_{(4-n)}$. These molecules simultaneously comprise hydrolyzable functions which give rise to a silica network or matrix comprising organic functions which remain attached to the silica backbone.

According to one variant of the invention, the sol-gel layer also comprises particles of at least one metal oxide or of at least one chalcogenide.

According to another variant of the invention, the silica-based organic/inorganic hybrid matrix also comprises at least one metal oxide. Such a silica-based matrix comprising organic functions and at least one metal oxide may be obtained from the combined use of organosilane and of at least one precursor of a metal oxide. These precursors then form with the organosilane a hybrid matrix of silica and of metal oxide.

According to the preferred embodiment of the invention, the sol-gel layer comprises a silica-based organic/inorganic hybrid matrix and at least one metal oxide in which are dispersed particles of at least one metal oxide or of at least one chalcogenide such as an organic/inorganic matrix of silica and of zirconium oxide in which are dispersed titanium dioxide particles.

The main compounds of the sol-gel layer of the invention consist of the compounds forming the matrix and of the particles dispersed in said matrix. The main compounds of the sol-gel layer may thus be:
  the silica comprising organic functions of the matrix,
  the metal oxide(s) of the matrix,
  the metal oxide and/or chalcogenide particles dispersed in the matrix.

To adapt with precision the refractive index of the sol-gel layer, the proportions of metal oxides originating from the matrix or dispersed in the form of particles are modified. As a general rule, the metal oxides have a higher refractive index than that of silica. By increasing the proportions of metal oxide, the refractive index of the sol-gel layer is increased. The refractive index of the sol-gel layer increases linearly as a function of the volume fraction of one type of metal oxide for volume proportions of said metal oxide less than a threshold value. For example, when $TiO_2$ particles are added, a linear variation in the refractive index of the sol-gel layer is observed for volume proportions of $TiO_2$ relative to the total volume of the main compounds of the sol-gel layer of less than 20%.

It is thus possible to determine theoretically the refractive index of a sol-gel layer as a function of the main compounds constituting it and thus to determine theoretically the formulation of a sol-gel solution which will make it possible to obtain after curing a sol-gel layer having the required refractive index.

The solution of the invention is thus particularly advantageous. For example, on receiving glass substrates intended to be used as lower outer layer, their refractive index is measured. Next, a sol-gel solution is formulated which will give after curing a sol-gel layer having a refractive index harmony with said substrate of less than 0.020 and preferably 0.015.

The sol-gel layers may have a refractive index varying within a wide index range especially 1.459 to 1.700, preferably 1.502 to 1.538 and better still from 1.517 and 1.523.

The main compounds of the sol-gel layer represent by mass relative to the total mass of the sol-gel layer, preferably in increasing order, at least 80%, at least 90%, at least 95%, at least 99%, 100%.

The sol-gel layer preferably comprises by mass relative to the total mass of the main compounds constituting the sol-gel layer:
  50% to 100%, preferably 70% to 95% and better still 85% to 90% of silica comprising organic functions of the matrix, and/or
  0 to 10%, preferably 1% to 5% and better still 2% to 4% of metal oxide of the matrix, and/or
  0 to 40%, preferably 1% to 20% and better still 5% to 15% of metal oxide and/or chalcogenide particles dispersed in the matrix.

The volume proportions of the metal oxide particles relative to the total volume of the main compounds of the sol-gel layer is, preferably by increasing order, between 0 and 25%, between 1% and 25%, between 2% and 8%.

The sol-gel layer is obtained by curing a sol-gel solution and comprises the product resulting from the hydrolysis and condensation of at least one organosilane of general formula $R_nSiX_{(4-n)}$ in which:
  n is equal to 1, 2, 3, preferably n is equal to 1 or 2 and better still n is equal to 1,
  the groups X, which may be identical or different, represent hydrolyzable groups chosen from alkoxy, acyloxy and halide groups, preferably alkoxy groups, and
  the groups R, which may be identical or different, represent non-hydrolyzable organic groups (or organic functions) bonded to silicon via a carbon atom.

Preferably, the sol-gel layer is obtained by curing a sol-gel solution and comprises the product resulting from the hydrolysis and condensation of:
  i) at least one organosilane and
  ii) at least one precursor of a metal oxide and/or
  iii) particles of at least one metal oxide or of at least one chalcogenide.

The metal oxide particles and/or the precursors of the metal oxides comprise a metal chosen from titanium, zirconium, zinc, niobium, aluminum and molybdenum.

The organosilane(s) comprise 2 or 3 and in particular 3 hydrolyzable groups X, and one or two, in particular one non-hydrolyzable group R.

The groups X are preferentially chosen from alkoxy groups —O—R', in particular C1-C4 alkoxy, acyloxy groups —O—C(O)R' in which R' is an alkyl radical, preferentially of C1-C6, preferably methyl or ethyl, halide such as Cl, Br and I, and combinations of these groups. Preferably, the groups. X are alkoxy groups and in particular methoxy or ethoxy.

The group R is a non-hydrolyzable hydrocarbon-based group. A certain number of groups are suitable according to the invention. The presence and nature of these groups makes it possible to obtain sol-gel layers having thicknesses that are compatible with the applications of the invention. Preferably, the group R corresponding to the non-hydrolyzable organic function has a molar mass of at least 50 g/mol and preferably of at least 100 g/mol. This group R is thus an unremovable group, even after the step of drying the sol-gel layer, and may be chosen from:

- alkyl groups, preferably linear or branched C1 to C10 and more preferably C3 to C10 alkyl groups, for instance methyl, ethyl, propyl, n-butyl, i-butyl, sec-butyl and tert-butyl groups;
- alkenyl groups, preferably C2 to C10 alkenyl groups, for instance vinyl, 1-propenyl, 2-propenyl and butenyl groups;
- alkynyl groups, for instance acetylenyl and propargyl groups;
- aryl groups, preferably C6 to C10 aryl groups, such as phenyl and naphthyl groups;
- alkylaryl groups;
- arylalkyl groups;
- (meth)acryl and (meth)acryloxypropyl groups;
- glycidyl and glycidyloxy groups.

The groups defined above such as the alkyl, alkenyl, alkynyl, alkylaryl and arylalkyl groups may also comprise at least one group chosen from primary, secondary or tertiary amine (the non-hydrolyzable radical is then, for example, an aminoaryl or aminoalkyl group), amide, alkylcarbonyl, substituted or unsubstituted aniline, aldehyde, ketone, carboxyl, anhydride, hydroxyl, alkoxy, aikoxycarbonyl, mercapto, cyano, hydroxyphenyl, alkyl carboxylate, sulfonic acid, phosphoric acid or meth(acryloxyloxy) groups, groups comprising an epoxide ring such as glycidyl and glycidyloxy and allyl and vinyl groups.

The particularly preferred organosilanes comprise identical or different, preferably identical, groups X and represent a hydrolyzable group, preferably a C1 to C4 alkoxy group, more preferably an ethoxy or methoxy group; and R is a non-hydrolyzable group, preferably a glycidyl or glycidyloxy C1 to C20 and preferably C1 to C6 alkylene group, for example a glycidyloxypropyl group, a glycidyloxyethyl group, a glycidyloxybutyl group, a glycidyloxypentyl group, a glycidyloxyhexyl group and a 2-(3,4-epoxycyciohexyl) ethyl group.

Advantageously, the organosilane compound is chosen from the following compounds: allyltrimethoxysilane, N-(2-aminoethyl)-3-aminopropyltrimethoxysilane, N—[N'-(2'-aminoethyl)-2-aminoethyl]-3-aminopropyltrimethoxysilane, 3-aminopropyltrimethoxysilane, 3-glycidoxypropyltrimethoxysilane (GLYMO), 3-mercaptopropyltrimethoxysilane, 3-methacryloxypropylmethyldimethoxysilane, 3-methacryloxypropyltrimethoxysilane, N-phenylaminopropyltrimethoxysilane, vinyltrimethoxysilane, 3-aminopropyltriethoxysilane, p-aminophenylsilane, 3-aminopropyltriethoxysilane, 3-glycidoxypropyldiisopropylethoxysilane, 3-glycidoxypropyltriethoxysilane, (3-glycidoxypropyl)methyldiethoxysilane, 3-mercaptopropyltriethoxysilane, 3-methacryloxypropylmethyldiethoxysilane, vinylmethyldiethoxysilane, vinyltriethoxysilane, N-[(3-(triethoxysilyl)propyl]-4,5-dihydroximidazole.

Among the compounds listed above, the preferred compound is GLYMO.

The metal oxide and/or chalcogenide particles dispersed in the silica-based organic/inorganic hybrid matrix are preferably chosen from the following group: $TiO_2$, $ZrO_2$, $ZnO$, $NbO$, $SnO_2$, $Al_2O_3$, $MoO_3$, $ZnS$, $ZnTe$, $CdS$, $CdSe$, $IrO_2$, $WO_3$, $Fe_2O_3$, $FeTiO_3$, $BaTi_4O_9$, $SrTiO_3$, $ZrTiO_4$, $CO_3O_4$, ternary oxide based on bismuth, $MoS_2$, $RuO_2$, $Sb_2O_4$, $Sb_2O_5$, $BaTi_4O_9$, $MgO$, $CaTiO_3$, $V_2O_5$, $Mn_2O_3$, $CeO_2$, $RuS_2$, $Y_2O_3$, $La_2O_3$.

Preferably, the particles are particles of a metal oxide comprising a metal chosen from titanium, zirconium, zinc, niobium, aluminum and molybdenum.

According to a particularly advantageous embodiment, the metal oxide is a titanium oxide ($TiO_2$), in rutile or anatase form, or a zirconium oxide ($ZrO_2$).

The particles of at least one metal oxide or of at least one chalcogenide have, preferably in increasing order, a mean diameter of less than or equal to 1 μm, less than or equal to 60 nm, less than or equal to 50 nm, less than or equal to 20 nm. The particles generally have a diameter of greater than 1 nm and better still greater than 5 nm.

The refractive index of the chalcogenide metal oxides is, preferably in increasing order, greater than 1.49, greater than 1.5, greater than 1.6, greater than 1.7, greater than 1.8, greater than 1.9, greater than 2, greater than 2.1, greater than 2.2.

As a commercial product that may be used, mention may be made of the product sold under the name Optolake 1120Z® (11RU7-A-8) by the company Catalyst & Chemical (CCIC) corresponding to a $TiO_2$ colloid. Mention may also be made of the product sold by the company Cristal Global under the reference S5-300A corresponding to a stable aqueous dispersion of $TiO_2$ particles at 23% by mass relative to the total mass of the dispersion, having a BET specific surface area of about 330 $m^2$/g and a mean diameter of about 50 nm.

The metal oxide precursors may be chosen from organometallic compounds such as metal alkoxides, and metal salts, which comprise the metal elements.

The metal oxide precursors may comprise a metal chosen from titanium, zirconium, zinc, niobium, aluminum and molybdenum. Preferably, the sol-gel solution comprises at least one zirconium, aluminum or titanium oxide precursor, preferably a metal alkoxide or a metal halide. Examples of precursor compounds are the following:

$Al(OCH_3)_3$, $Al(OC_2H_5)_3$, $Al(OC_3H_7)_3$, $Al(OC_4H_9)_3$, $Al(OC_2H_4OC_4H_9)_3$, $AlCl_3$, $AlCl(OH)_2$, $TiCl_4$, $Ti(OC_2H_5)_4$, $Ti(OC_3H_7)_4$, $Ti(OC_4H_9)_4$, $Ti(2$-ethylhexoxy$)_4$, $ZrCl_4$, $Zr(OC_2H_5)_4$, $Zr(OC_3H_7)_4$, $ZrOCl_2$, $Zr(2$-ethylhexoxy$)_4$.

Preferably, the sol-gel solution according to the invention comprises a single precursor compound chosen from zirconium alkoxides, such as zirconium tetrapropoxide (TPOZ).

The organosilanes (i), the metal oxide precursors (ii) and the metal oxides and chalcogenide (iii) are the main compounds of the sol-gel solution. The sol-gel solution comprises, besides these "main" products, additives and solvents. The additives preferably represent less than 10% and preferably less than 5% by mass relative to the total mass of the sol-gel solution.

The proportions of organosilanes, by mass relative to the total mass of the main components of the sol-gel solution, are, preferably in increasing order, between 50% and 99%, between 60% and 98%, between 70% and 95%, between 80% and 90%.

The proportions of the metal oxide precursors, by mass relative to the total mass of the main components of the sol-gel solution, are, preferably in increasing order, between 0 and 10%, between 1% and 10%, between 2% and 8%, between 4% and 7%.

The proportions of the metal oxides and chalcogenides, by mass relative to the total mass of the main components of the sol-gel solution, are, preferably in increasing order, between 0 and 40%, between 1% and 20%, between 2% and 10%, between 4% and 9%.

The sol-gel solution may comprise, in addition to the main compounds, at least one solvent and optionally at least one additive.

The solvents are chosen from water and organic solvents. The sol-gel solution preferably comprises water to allow the hydrolysis and condensation reactions. The sol-gel solution may also comprise at least one organic solvent whose boiling point, at atmospheric pressure, is preferably between 70 and 140° C. As organic solvent that may be used according to the invention, mention may be made of alcohols, esters, ketones and tetrahydropyran, and mixtures thereof. The alcohols are preferably chosen from C1-C6 alcohols, such as methanol. The esters are preferably chosen from acetates, and mention may be made in particular of ethyl acetate. Among the ketones, methyl ethyl ketone will preferably be used.

Among the suitable solvents, mention may thus be made of water, methanol, ethanol, propanol (n-propanol and iso-propanol), butanol, 1-methoxy-2-propanol, 4-hydroxy-4-methyl-2-pentanone, 2-methyl-2-butanol and butoxyethanol, and water/organic solvent mixtures.

The proportions of solvent may vary within a wide range. They will especially depend on the thicknesses to be obtained. Specifically, the greater the solid content of the sol-gel solution, the more possible it is to deposit large thicknesses and thus to obtain sol-gel layers of large thicknesses.

The mass proportions of solvent relative to the total mass of the sol-gel solution may represent, for example, at least 10% and not more than 80%.

Similarly, the mass proportions of the main compounds relative to the total mass of the sol-gel solution represent, for example, at least 20% and not more than 90%.

The mass proportions of water relative to the total mass of the sol-gel solution represent, for example, between 10% and 40%, between 10% and 30% or between 15% and 25%.

When the sol-gel solution also comprises one or more organic solvents, the mass proportions of organic solvent relative to the total mass of the sol-gel solution represent, for example, between 10% and 40%, between 10% and 30% or between 15% and 25%.

The composition may also comprise various additives such as surfactants, UV absorbers, pigments or dyes, hydrolysis and/or condensation catalysts, and curing catalysts. The total proportions of the additives preferably represent less than 5% by mass relative to the total mass of the sol-gel solution.

The surfactants improve the wetting properties and promote better spreading of the composition on the surface to be coated. Among these surfactants, mention may be made of nonionic surfactants such as ethoxylated or neutral fatty alcohols, for example fluoro surfactants. Mention may be made especially, as fluoro surfactant, of the product sold by 3M under the reference FC-4430.

The proportions of surfactants by mass relative to the total mass of the sol-gel solution represent, preferably in increasing order, 0.01% to 5%, 0.05% to 3%, 0.1% to 2%.

The hydrolysis and/or condensation catalysts are preferably chosen from acids or bases.

The acid catalysts may be chosen from organic acids and mineral acids, and mixtures thereof. The organic acids may be chosen especially from carboxylic acids such as aliphatic monocarboxylic acids, for instance acetic acid, polycarboxylic acids such as dicarboxylic acids and tricarboxylic acids, for example citric acid, and mixtures thereof. Among the mineral acids, use may be made of nitric acid or hydrochloric acid, and mixtures thereof.

Acetic acid has the additional advantage, when the composition comprises a metal oxide precursor, of acting as a stabilizer. Specifically, acetic acid chelates these precursors and thus prevents excessively rapid hydrolysis of this type of product.

The basic catalysts may be chosen from amine bases such as ethanolamine and triethylamine, and mixtures thereof. A particular base is used in the case where acids would be prohibited due to the nature of the substrate or of the silane used.

The solution may also comprise pigments, dyes or nacres. According to this embodiment, the sol-gel layers may have a colored appearance. Another alternative for obtaining this colored appearance consists in selecting to introduce into the matrix of colloidal particles colored metal oxides such as cobalt, vanadium, chromium, manganese, iron, nickel or copper oxide particles and oxide particles of any other transition metal or non-metal capable of giving said colored appearance.

The deposition may be performed according to one of the following techniques:
  dip-coating;
  spin-coating;
  laminar-flow-coating or meniscus coating;
  spray-coating;
  soak-coating;
  roll-processing;
  paint-coating;
  screen printing
  slot-coating; or
  inkjet coating.

The deposition is preferably performed by spraying with pneumatic atomization, screen printing or inkjet coating since these techniques advantageously make it possible to draw designs without particular masking.

The sol-gel layer fills at least part of the roughness of the substrate. When it is desired to obtain transparent designs, the thickness of the sol-gel layer must be sufficient to flatten out the surface of the substrate.

Good transparency is obtained when the thickness of the sol-gel layer is:
  greater than the roughness parameter value Ra of the textured surface of the substrate or
  approximately equal and preferably greater than or equal to the peak-to-valley height of the textured surface of the substrate.

The choice of thickness of the sol-gel layer will depend on the desired effect. The sol-gel layer may thus have a thickness corresponding to:
- at least 10%, 20%, 30%, 40%, 50%, 60%, 70%, 80%, 90% or 100% of the peak-to-valley height, and/or
- not more than 100%, 90%, 80%, 70%, 60%, 50%, 40% of the peak-to-valley height.

Preferably, the textured surface of the substrate coated with the sol-gel layer has:
- a peak-to-valley height of less than 10 μm, better still less than 5 μm and even better still less than 1 μm,
- a roughness parameter Ra of less than 1 μm, better still less than 0.5 μm and even better still less than 0.1 μm and especially between 0.01 to 1 μm.

The thickness of the sol-gel layer may be, for example, between 5 nm and 100 μm and preferably between 50 nm and 50 μm. This thickness may be obtained as a single layer, by one or more application operations (or passes), by techniques such as dipping, spraying or spraying.

The drying temperature of the sol-gel film may range from 0 to 200° C., preferably from 100° C. to 150° C. and more preferably from 120 to 170° C.

Advantageously, the glazing of the invention comprises on the part of the textured surface of the substrate comprising a sol-gel layer:
- a transmission haze measured according to standard ASTM D 1003 of less than 5%, preferably less than 2.5% and better still less than 1%,
- a lightness measured with a Haze-Gard Plus machine from BYK of greater than 93%, preferably greater than 95% and better still greater than 97%.

The choice of the intrinsic reflection and transmission properties of the substrate or of the sol-gel layer depend on the expectations between good transparency of the glazing and the obtention of other properties such as color.

Advantageously, the glazing of the invention comprises on the part of the textured surface of the substrate not comprising a sol-gel layer a transmission haze of greater than 15 and/or a lightness of less than 90%.

The texture or roughness of the textured surface of the substrate is formed by a plurality of designs that are hollowed or protruding relative to a general plane. Preferably, the mean height of the designs is between 1 micrometer and 100 μm. For the purposes of the invention, the mean height of the designs on the textured surface (corresponding to Ra) is defined as the arithmetic mean of the distances $y_i$ as an absolute value taken between the peak and the general plane of the surface for each design of the contact surface, equal to $$\frac{1}{n}\sum_{i=1}^{n}|y_i|.$$

The designs of the texture of the surface of the substrate may be randomly distributed on the main textured surface of the substrate. As a variant, the designs of the texture of the textured surface of the substrate may be distributed periodically on the contact surface. These designs may especially be cones, pyramids, grooves, channels or wavelets.

Advantageously, the main smooth outer surfaces of the substrate covered with the sol-gel layer are flat or bent and, preferably, these main surfaces are parallel to each other. This contributes toward limiting the light dispersion for radiation passing through the layered element, and thus toward improving the clearness of vision through the layered element.

In one embodiment of the invention, the substrate is a substrate made of glass, vitroceramic or polymer and the sol-gel layer is deposited on the main textured surface of the substrate.

The designs may have any form and may be more or less large. The designs may correspond to a part of the surface of the glazing representing a few $cm^2$ to several $m^2$.

Finally, a subject of the invention is the use of the glazing as described previously as all or part of a glazing for a vehicle, building, street furniture or interior furniture.

The characteristics and advantages of the invention will emerge in the description that follows of several embodiments of a layered element, given solely as an example and made with reference to the attached drawings in which:

FIGS. 1 and 2 are schematic cross sections of a glazing according to the invention;

FIG. 3 shows the change in refractive index as a function of the volume proportions of $TiO_2$ in a sol-gel layer, FIG. 4 shows images taken with a scanning electron microscope of satin-finished substrates of transparent rough glass Satinovo® onto which a sol-gel layer has been deposited via a sol-gel process, FIGS. 5 and 6 are graphs showing the change in haze (right-hand y-axis) and in lightness (left-hand y-axis) as a function of the refractive index of the sol-gel layer and of the variation in refractive index between a substrate Satinovo® and the sol-gel layer.

For the sake of clarity of drawing, the relative thicknesses of the various layers in the figures have not been rigorously respected.

The glazing 1 illustrated in FIG. 1 comprises a substrate 2 and a sol-gel layer 4, which consist of transparent dielectric materials having substantially the same refractive index n2, n4. Each of these elements has a smooth main surface, 2A or 4A, respectively. The textured surface of the substrate is formed by a plurality of designs that are hollowed or protruding relative to a general plane of the surface.

The glazing 1 illustrated in FIG. 2 comprises a sol-gel layer 4 which smoothes out the roughness of the substrate 2. The outer smooth surfaces 2A and 4A of the glazing 1 allow specular transmission of radiation, i.e. the entry of radiation or the exit of radiation without modifying the direction of the radiation.

An example of a process for manufacturing the glazing of the invention is described below. The process for manufacturing a glazing according to the invention may comprise the steps in which:
- the refractive index of the substrate is measured, and
- a sol-gel solution is chosen which will give after cross-linking a sol-gel layer for which the absolute value of the difference in refractive index at 589 nm between the constituent dielectric materials of the substrate and of the sol-gel layer is less than or equal to 0.020 and preferably less than or equal to 0.015.

A textured glass substrate of the type such as Satinovo®, Albarino® or Masterglass® or a substrate based on a rigid or flexible polymer material, for example of the type such as polymethyl methacrylate or polycarbonate, may be used. The sol-gel layer is then deposited on the textured surface of the substrate. This layer, in the viscous, liquid or pasty state, embraces the texture of the surface of the substrate.

The glazing according to the invention may be used for all known applications of glazings, such as for vehicles, buildings, street furniture, interior furniture, lighting, etc. The glazing of the invention is most particularly useful as doors, partitions of interior walls, glass shower screens, balconies, furniture, glass shelves, kitchen accessories and work surfaces, etc.

EXAMPLES

I. Preparation of Sol-Gel Solutions and of Sol-Gel Layers Comprising an Adjustable Refractive Index The sol-gel layers prepared in the examples comprise an organic/inorganic hybrid matrix of silica and of zirconium oxide in which are dispersed titanium dioxide particles. The main compounds used in the sol-gel solutions are:
- 3-glycidoxypropyltrimethoxysilane (GLYMO),
- zirconium propoxide in the form of a solution at 70% by mass in propanol,
- $TiO_2$, sold under the name Cristal Activ™, in the form of particles with a diameter of less than 50 nm in an aqueous dispersion with a solids content of 23% by mass.

A first precursor composition of the matrix is prepared by mixing the organosilane, the solution of zirconium propoxide, acetic acid and optionally water. The constituents are mixed dropwise with vigorous stirring. The other compounds are then added to this first composition, i.e. the aqueous dispersion of titanium dioxide in the form of particles, the surfactant and optionally other dilution solvents such as ethanol. The sol-gel solution is thus obtained.

Depending on the dispersion proportions of titanium dioxide added to the sol-gel solution, the matrix of the sol-gel layer once crosslinked will be more or less charged with $TiO_2$ particles. The refractive index of the sol-gel layer depends on the volume fraction of titanium dioxide. It is thus possible to vary the refractive index of the resulting sol-gel layer between 1.490 and 1.670 with a high-precision adjustment of the order of 0.001. It is thus possible to obtain for all types of standard glass substrates used as lower outer layer an index harmony of less than 0.015.

The solids content of the sol-gel layer has an influence on the maximum thickness that it is possible to deposit in one pass.

In order to illustrate these results, various sol-gel solutions were prepared. These solutions were then applied by spraying onto a support and crosslinked for a time of 20 minutes to a few hours at a temperature of 150° C. or 200° C. so as to form sol-gel layers having refractive indices varying between 1.493 to 1.670.

II. Influence of the Volume Proportions of $TiO_2$ on the Refractive Index of the Sol-Gel Layer The tables below summarize the compositions of the sol-gel solutions tested and also the compositions of the resulting sol-gel layers.

As regards the sol-gel solution, the given proportions correspond to the mass proportions relative to the total mass of the sol-gel solution.

| Sol-gel solution | A | B | C | D | E | F | G | H | I |
|---|---|---|---|---|---|---|---|---|---|
| Main compounds: | | | | | | | | | |
| GLYMO | 68.1 | 64.2 | 55.6 | 52.5 | 22.5 | 20.3 | 18.3 | 16.6 | 14.8 |
| Zirconium propoxide | 4.8 | 4.5 | 3.9 | 3.7 | 1.6 | 1.4 | 1.3 | 1.2 | 1.0 |
| $TiO_2$ | 0.0 | 2.8 | 4.2 | 6.5 | 3.5 | 5.1 | 6.6 | 7.8 | 9.1 |
| Additives | | | | | | | | | |
| Acetic acid | 4.3 | 4.0 | 3.5 | 3.3 | 1.4 | 1.3 | 1.1 | 1.0 | 0.9 |
| 3M-FC 4430 | 0.0 | 0.1 | 0.2 | 0.3 | 0.2 | 0.2 | 0.3 | 0.3 | 0.4 |
| Solvents | | | | | | | | | |
| Propanol | 2.0 | 1.9 | 1.7 | 1.6 | 0.7 | 0.6 | 0.5 | 0.5 | 0.4 |
| Water | 12.8 | 21.6 | 24.4 | 31.6 | 16.0 | 20.9 | 25.5 | 29.2 | 33.3 |
| Ethanol | 0.0 | 12.4 | 18.2 | 28.2 | 15.3 | 22.2 | 28.6 | 33.9 | 39.6 |
| Total | 100 | 100 | 100 | 100 | 100 | 100 | 100 | 100 | 100 |

As regards the sol-gel layer, the volume proportions of $TiO_2$ are defined relative to the total volume of the main components comprising the hybrid matrix of silica and of zirconium oxide and the $TiO_2$ particles. The proportions of the main components correspond to the mass proportions of the main compounds of the sol-gel layer relative to the total mass of main compounds.

| Sol-gel layer | A | B | C | D | E | F | G | H | I |
|---|---|---|---|---|---|---|---|---|---|
| Main compounds*: | | | | | | | | | |
| Gly-SiO2 | 96 | 91 | 87 | 82 | 79 | 72 | 65 | 59 | 53 |
| ZrO2 | 4 | 3 | 3 | 3 | 3 | 3 | 2 | 2 | 2 |
| TiO2 | 0 | 6 | 9 | 14 | 18 | 26 | 33 | 39 | 46 |
| Volume % of TiO2 | 0 | 3 | 5 | 8 | 9.8 | 15 | 20.1 | 24.7 | 30 |
| Measured index | 1.493 | 1.517 | 1.529 | 1.557 | 1.567 | 1.600 | 1.623 | 1.651 | 1.674 |
| Theoretical index | 1.493 | 1.515 | 1.528 | 1.549 | 1.564 | 1.599 | — | — | — |

Following the crosslinking of the organosilane and of the zirconium propoxide by hydrolysis reaction and condensation, a matrix is obtained in the sol-gel layer, this matrix being based on silicon oxide comprising a non-hydrolyzable organic group referred to hereinbelow as "Gly-SiO$_2$" and of zirconium oxide in which are dispersed the $TiO_2$ particles. These three compounds represent the main compounds of the sol-gel layer.

The volume fraction of titanium dioxide has a linear influence on the refractive index of the sol-gel layer for volume proportions of $TiO_2$ of less than 20%. For higher proportions, the refractive index continues to increase, but a fall in the slope of the curve is observed. However, once this curve has been determined, a person skilled in the art is capable of estimating, by approximation, the refractive index of a sol-gel layer comprising a volume fraction of $TiO_2$ of greater than 20%.

FIG. 3 shows the change in refractive index as a function of the volume proportions of TiO$_2$ in the sol-gel layer. The linear change in refractive index as a function of the proportions of TiO$_2$ is observed for proportions of less than 20%.

The precision on the refractive index is 7×10$^{-4}$ for an error of 0.1% by volume on the amount of TiO$_2$.

III. SEM Observation

Observations by scanning electron microscopy were performed to ensure that the sol-gel layers make it possible to fill in thickness the roughness of the substrate and to obtain a flat upper surface. The images in FIG. 4 show satin-finish substrates of transparent rough glass Satinovo® from the company Saint-Gobain on which a sol-gel layer O has been deposited via a sol-gel process. The glazing of the invention corresponds to a glass that is rough in places, having transparent and translucent zones.

These substrates 4 mm thick comprise a main textured surface obtained by acid attack. The mean height of the texturing designs of the substrate which corresponds to the roughness Ra of the textured surface of the glass Satinovo® is between 1 and 5 μm. Its refractive index is 1.518 and its peak-to-valley height (PV) is between 12 and 17 μm.

In the left image showing in cutaway view the substrate Satinovo® covered with the sol-gel layer, it is clearly seen that the texture is formed by a plurality of designs that are hollowed or protruding relative to the general plane of the contact surface. The thickness of the sol-gel layer is 14.3 μm.

The right image shows a top view of the same substrate. The sol-gel layer has not been applied to the entire surface of the substrate Satinovo®. The sol-gel layer makes it possible to even out the roughness of the substrate.

This substrate Satinovo® coated with a sol-gel layer has a light transmission TL of 90.1%, a haze of 1.88% and a lightness of 92.5%.

IV. Evaluation of the Influence of the Index Harmony

In order to measure the influence of the index harmony between the sol-gel layer and the substrate, various sol-gel solutions were prepared and deposited onto satin-finish substrates of transparent rough glass Satinovo® defined above. The thicknesses of the sol-gel layers deposited after drying are about 15 μm.

The aim of this test is to show the influence of the index harmony on the optical properties of the glazing, such as:

the light transmission values T$_L$ in the visible range as a percentage, measured according to standard ISO 9050: 2003 (illuminant D65; 2° observer), the haze transmission values (Haze T) as percentages, measured with a hazemeter according to standard ASTM D 1003 for incident radiation on the layered element on the lower outer layer side, the percentage lightness with the Haze-Gard hazemeter from BYK.

Furthermore, the quality "of vision" through the glazing thus coated was evaluated visually by 5 observers in a blind test, i.e. without the observers knowing the characteristics such as the refractive index or the index harmony of the sol-gel layers with the substrate. The observers attributed for each substrate coated with a sol-gel layer an assessment indicator chosen from: "−" not correct, "+" correct, "++" good, "+++" excellent.

The tables below summarize the compositions of the sol-gel solutions tested and the compositions of the resulting sol-gel layers.

The results obtained are collated in the table below.

| Sol-gel layer | Index 589 nm | Δn | TL (%) | Haze (%) | Lightness (%) | \multicolumn{5}{c}{Visual observation} |||||
|---|---|---|---|---|---|---|---|---|---|---|
| | | | | | | P1 | P2 | P3 | P4 | P5 |
| G | 1.623 | −0.105 | − | − | 20.7 | − | − | − | − | − |
| E | 1.566 | −0.048 | − | − | 76.9 | − | − | − | − | − |
| D | 1.557 | −0.039 | − | − | 87.4 | − | + | ++ | ++ | ++ |
| P | 1.532 | −0.014 | 89.8 | 0.3 | 94 | + | + | + | ++ | ++ |
| C | 1.529 | −0.010 | − | − | 97.5 | ++ | ++ | ++ | ++ | ++ |
| O | 1.524 | −0.006 | 90.0 | 0.5 | 98 | +++ | +++ | +++ | +++ | +++ |
| B | 1.517 | 0.002 | − | − | 98 | +++ | +++ | +++ | +++ | +++ |
| N | 1.514 | 0.000 | 89.8 | 0.5 | 100 | +++ | +++ | +++ | +++ | +++ |
| M | 1.508 | 0.010 | 90.0 | 0.5 | 98 | ++ | ++ | ++ | ++ | ++ |
| L | 1.504 | 0.014 | 89.6 | 0.4 | 96 | ++ | ++ | ++ | ++ | ++ |
| K | 1.500 | 0.018 | 90.0 | 0.5 | 93 | − | + | ++ | ++ | ++ |
| A | 1.493 | 0.025 | 89.9 | 1.1 | 90 | − | − | − | − | − |
| Q | 1.484 | 0.030 | 89.5 | 1.6 | 78 | − | − | − | − | − |
| R | 1.476 | 0.038 | 89.5 | 3.5 | 68 | − | − | − | − | − |
| S | 1.468 | 0.046 | 89.5 | 2.9 | 60 | − | − | − | − | − |

Δn represents the variation in index between the substrate Satinovo ® and the sol-gel layer.

FIG. 5 is a graph showing the change in haze (right-hand y-axis) and in lightness (left-hand y-axis) as a function of the refractive index of the sol-gel layer. The vertical black line illustrates the index of the glass substrate Satinovo®.

FIG. 6 is a graph showing the change in the haze (right-hand y-axis) and in the lightness (left-hand y-axis) as a function of the variation in refractive index between the substrate Satinovo® and the sol-gel layer.

Figure 1:
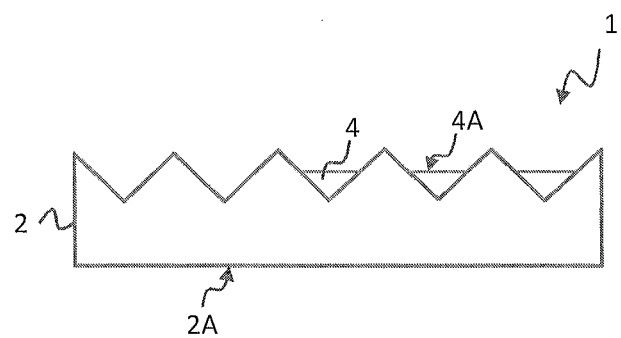
Figure 2:
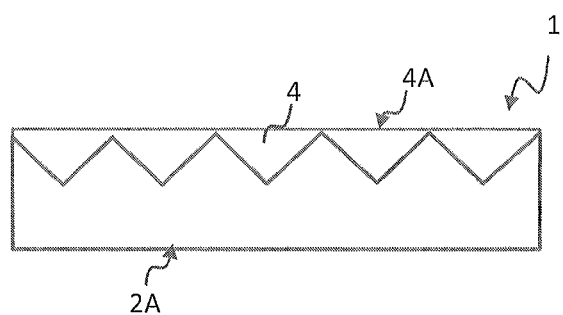
Figure 3:
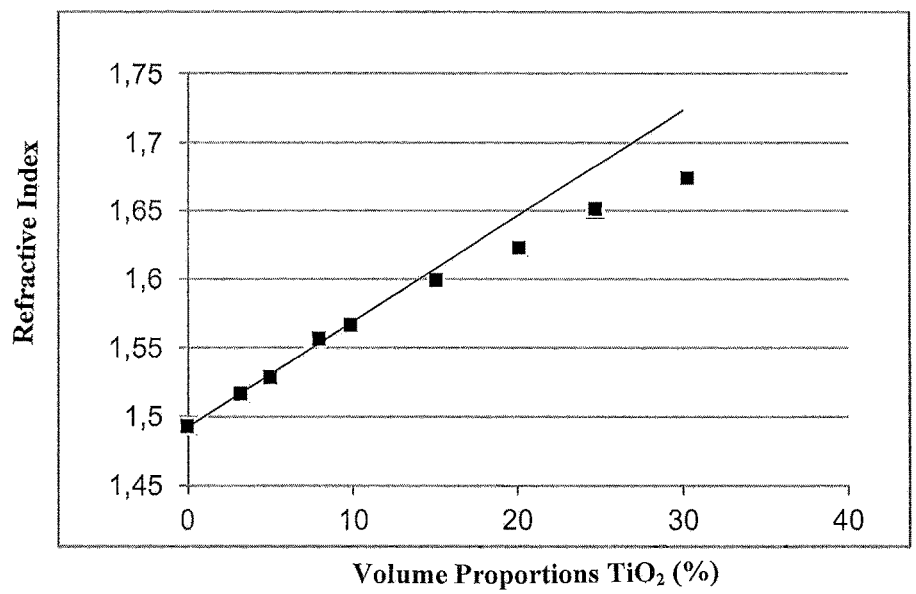
Figure 4:
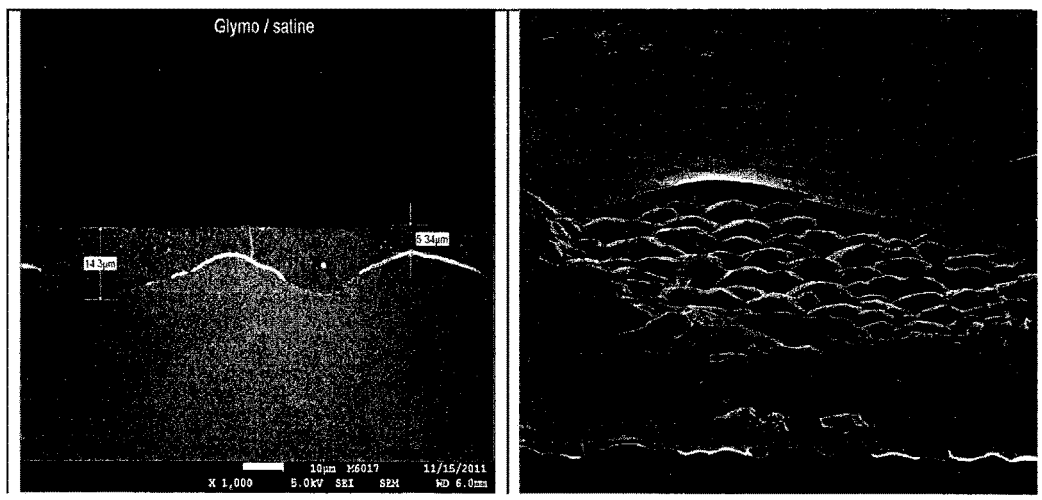

When the sol-gel layer has an index of between 1.500 and 1.530, haze values through the substrate thus coated of less than 0.5% are obtained. However, the haze values alone do not suffice to characterize the excellence of vision. This is why the lightness was also determined. It is found that, contrary to the haze values, which are virtually constant in the indicated index range, the lightness values reflect within this range a peak centered for refractive index values of the sol-gel layer about the index value of the substrate, i.e. 1.518. More particularly, good results are obtained for an index difference of less than 0.020 and excellent results are obtained for an index difference of less than 0.015, or even less than 0.005.

In conclusion, the absolute value of the index difference between the substrate of index $n_1$ and the sol-gel layer of index $n_2$ is preferably less than 0.020, better still less than 0.015 and even better still less than 0.013 so as to obtain good transparency of the designs.

The invention claimed is:

1. A glazing comprising a substrate having two main outer surfaces, at least one of which is a textured surface, consisting of a dielectric material having a refractive index $n_1$, wherein:
   at least a part of the textured surface of the substrate is coated with a sol-gel layer consisting of a dielectric material having a refractive index $n_2$, and
   the absolute value of the difference in refractive index at 589 nm between constituent dielectric materials of the substrate and the sol-gel layer is less than or equal to 0.020, and
   wherein the part of the textured surface of the substrate comprising the sol-gel layer has a transmission haze of less than 5% and a lightness of greater than 93%.

2. The glazing as claimed in claim 1, wherein the substrate has two main outer surfaces, at least one of which is a textured surface and the other is a smooth surface.

3. The glazing as claimed in claim 1, wherein the textured surface of the substrate has a roughness parameter Ra of at least 0.5 µm.

4. The glazing as claimed in claim 1, wherein the part of the textured surface of the substrate comprising a sol-gel layer defines a transparent design.

5. The glazing as claimed in claim 1, wherein the thickness of the sol-gel layer is greater than or equal to the peak-to-valley height of the textured surface of the substrate.

6. The glazing as claimed in claim 1, wherein the textured surface of the substrate coated with a sol-gel layer has a roughness parameter Ra of less than 0.1 µm.

7. The glazing as claimed in claim 1, wherein the sol-gel layer comprises a silica-based organic/inorganic hybrid matrix.

8. The glazing as claimed in claim 6, wherein the sol-gel layer also comprises particles of at least one metal oxide or of at least one chalcogenide.

9. The glazing as claimed in claim 7, wherein the silica-based organic/inorganic hybrid matrix also comprises at least one metal oxide.

10. The glazing as claimed in claim 8, wherein the metal oxide comprises a metal chosen from titanium, zirconium, zinc, niobium, aluminum and molybdenum.

11. The glazing as claimed in claim 1, wherein the sol-gel layer comprises an organic/inorganic hybrid matrix of silica and of zirconium oxide in which are dispersed titanium dioxide particles.

12. The glazing as claimed in claim 1, wherein the part of the textured surface of the substrate not comprising a sol-gel layer has a transmission haze of greater than 15% and/or a lightness of less than 90%.

13. The glazing as claimed in claim 1, wherein the substrate is a glass or vitroceramic substrate.

14. A process for manufacturing a glazing as claimed in claim 1, comprising:
   providing a substrate comprising a textured surface of refractive index $n_1$,
   depositing on at least a part of the textured surface of the substrate a sol-gel layer consisting of a dielectric material having a refractive index $n_2$, for which the absolute value of the difference in refractive index at 589 nm between constituent dielectric materials of the substrate and of the sol-gel layer is less than or equal to 0.020.

15. The process as claimed in claim 14, wherein the absolute value of the difference in refractive index at 589 nm is less than or equal to 0.015.

16. The glazing as claimed in claim 1, wherein the substrate is a polymer substrate.

17. The glazing as claimed in claim 1, wherein the sol-gel layer is based on hydrolysis and condensation of at least one organosilane of general formula $R_n SiX_{(4-n)}$ in which:
   n is equal to 1, 2, 3,
   groups X, which are identical or different, represent hydrolyzable groups selected from the group consisting of alkoxy, acyloxy and halide groups, and
   groups R, which are identical or different, represent non-hydrolyzable organic groups bonded to silicon via a carbon atom.

* * * * *